(12) United States Patent
Ha

(10) Patent No.: US 11,934,203 B2
(45) Date of Patent: Mar. 19, 2024

(54) METHOD, SYSTEM, AND NON-TRANSITORY COMPUTER-READABLE RECORDING MEDIUM FOR CONTROLLING A ROBOT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 435 days.

(21) Appl. No.: 17/313,215

(22) Filed: May 6, 2021

(65) Prior Publication Data

US 2022/0357752 A1 Nov. 10, 2022

(51) Int. Cl.
| | | |
|---|---|---|
| G05D 1/02 | (2020.01) | |
| B25J 9/00 | (2006.01) | |
| G05D 1/00 | (2006.01) | |
| G10L 25/51 | (2013.01) | |
| H04R 1/40 | (2006.01) | |
| H04R 3/00 | (2006.01) | |

(52) U.S. Cl.
CPC .......... *G05D 1/0291* (2013.01); *B25J 9/0003* (2013.01); *G05D 1/0255* (2013.01); *G10L 25/51* (2013.01); *H04R 1/406* (2013.01); *H04R 3/005* (2013.01)

(58) Field of Classification Search
CPC ... G05D 1/0291; G05D 1/0255; B25J 9/0003; G10L 25/51; H04R 1/406; H04R 3/005
USPC .......................................................... 701/2
See application file for complete search history.

(56) References Cited

U.S. PATENT DOCUMENTS

| | | | | |
|---|---|---|---|---|
| 2015/0190927 | A1* | 7/2015 | Sutherland | H04L 65/60 901/1 |
| 2015/0202770 | A1* | 7/2015 | Patron | G06Q 30/0265 901/50 |
| 2019/0197396 | A1* | 6/2019 | Rajkumar | G06N 3/08 |
| 2019/0377349 | A1* | 12/2019 | van der Merwe | G06Q 10/08355 |
| 2020/0290210 | A1* | 9/2020 | Ha | B25J 11/0045 |
| 2022/0241965 | A1* | 8/2022 | Taira | B25J 9/1682 |

FOREIGN PATENT DOCUMENTS

| | | | | |
|---|---|---|---|---|
| JP | 2005125457 A | | 5/2005 | |
| JP | 2006181651 A | | 7/2006 | |
| JP | 2016109897 A | * | 6/2016 | |
| JP | 2017182261 A | * | 10/2017 | G06F 16/00 |
| JP | 2017205855 A | | 11/2017 | |
| JP | 2018513817 A | | 5/2018 | |
| JP | 2020046478 A | * | 3/2020 | |
| JP | 2020046478 A | | 3/2020 | |
| JP | 2020521997 A | | 7/2020 | |
| KR | 100641113 B1 | | 11/2006 | |
| KR | 1020200110143 A | | 9/2020 | |

\* cited by examiner

*Primary Examiner* — Yazan A Soofi
(74) *Attorney, Agent, or Firm* — Dinsmore & Shohl LLP; Yongsok Choi, Esq.

(57) ABSTRACT

A method for controlling a robot is provided. The method includes the steps of: acquiring information on a sound associated with a robot call in a serving place; determining a call target robot associated with the sound, among a plurality of robots in the serving place, on the basis of the acquired information; and providing feedback associated with the sound by the call target robot.

11 Claims, 6 Drawing Sheets

METHOD, SYSTEM, AND NON-TRANSITORY COMPUTER-READABLE RECORDING MEDIUM FOR CONTROLLING A ROBOT

FIELD OF THE INVENTION

The present invention relates to a method, system, and non-transitory computer-readable recording medium for controlling a robot.

BACKGROUND

Robots are utilized to replace or assist people in various fields because they can automatically perform difficult tasks or repetitive operations. Recently, various researches are being conducted on techniques for calling such robots.

As an example of related conventional techniques, Korean Registered Patent Publication No. 10-0641113 discloses a method for controlling movement of a mobile robot, wherein when a radio frequency (RF) signal and an infrared (IR) signal for calling a mobile robot are transmitted from a remote controller, the mobile robot receives the RF signal and the IR signal to switch to a call mode and moves to a position of the remote controller.

However, the techniques introduced so far as well as the above-described conventional technique have been only interested in using various signals such as RF signals and IR signals to call a robot capable of responding to the signals, and have not specifically addressed calling, when there are multiple robots capable of responding to the signals, a specific robot rather than all the robots. Meanwhile, in the case of using RF signals, IR signals, or the like, a robot may be called only when a user carries a device including a specific type of communication module corresponding to the signals, which may cause inconvenience in terms of user experience.

In this connection, the inventor(s) present a novel and inventive technique for specifying a call target robot among a plurality of robots on the basis of a sound made in a serving place and associated with a robot call, and providing feedback associated with the sound by the call target robot.

SUMMARY OF THE INVENTION

One object of the present invention is to solve all the above-described problems in the prior art.

Another object of the invention is to dynamically determine a call target robot associated with a call sound, among a plurality of robots in a serving place.

Yet another object of the invention is to efficiently and stably operate a plurality of robots in a serving place.

Still another object of the invention is to provide feedback associated with a call sound by a call target robot to assist a caller to easily identify the call target robot.

The representative configurations of the invention to achieve the above objects are described below.

According to one aspect of the invention, there is provided a method for controlling a robot, the method comprising the steps of: acquiring information on a sound associated with a robot call in a serving place; determining a call target robot associated with the sound, among a plurality of robots in the serving place, on the basis of the acquired information; and providing feedback associated with the sound by the call target robot.

According to another aspect of the invention, there is provided a system for controlling a robot, the system comprising: an information acquisition unit configured to acquire information on a sound associated with a robot call in a serving place; a call target robot determination unit configured to determine a call target robot associated with the sound, among a plurality of robots in the serving place, on the basis of the acquired information; and a feedback provision unit configured to provide feedback associated with the sound by the call target robot.

In addition, there are further provided other methods and systems to implement the invention, as well as non-transitory computer-readable recording media having stored thereon computer programs for executing the methods.

According to the invention, it is possible to dynamically determine a call target robot associated with a call sound, among a plurality of robots in a serving place.

According to the invention, it is possible to efficiently and stably operate a plurality of robots in a serving place.

According to the invention, it is possible to provide feedback associated with a call sound by a call target robot to assist a caller to easily identify the call target robot.

DETAILED DESCRIPTION OF THE INVENTION

Figure 1:
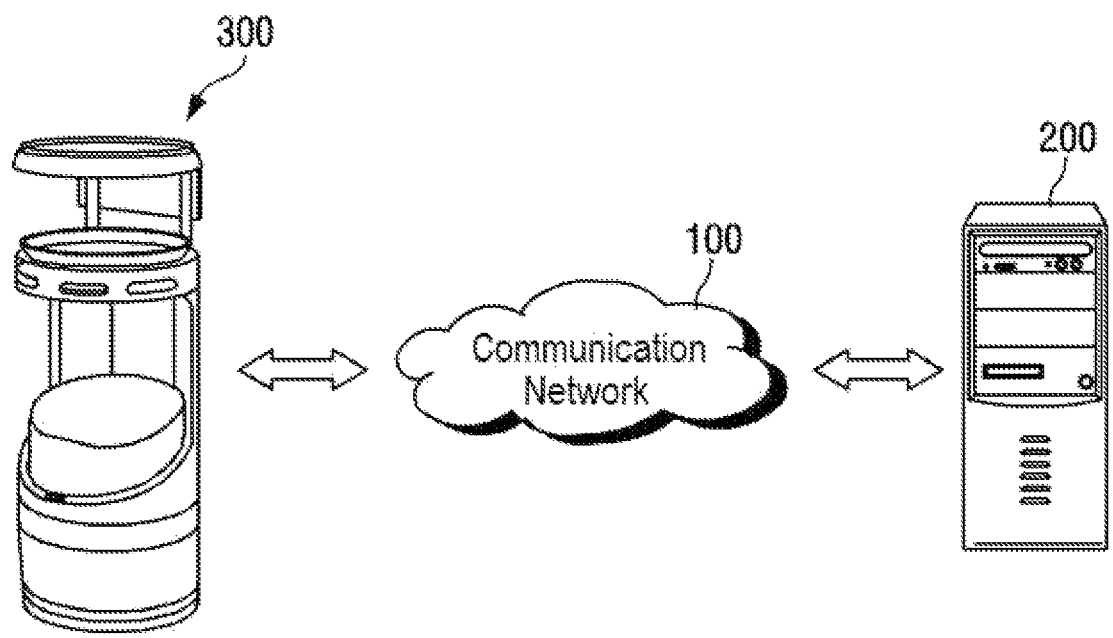
FIG. 1 schematically shows the configuration of an entire system for controlling a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a robot according to one embodiment of the invention.

As shown in FIG. 1, the entire system according to one embodiment of the invention may comprise a communication network 100, a robot control system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as Wi-Fi communication, Wi-Fi Direct communication, Long Term Evolution (LTE) communication, Bluetooth communication (more specifically, Bluetooth Low Energy (BLE) communication), infrared communication, and ultrasonic communication.

Next, the robot control system 200 according to one embodiment of the invention may communicate with the robot(s) 300 to be described below via the communication network 100, and may function to: acquire information on a sound associated with a robot call in a serving place; determine a call target robot 300 associated with the sound, among a plurality of robots 300 in the serving place, on the basis of the acquired information; and provide feedback associated with the sound by the call target robot 300.

Meanwhile, the above description is illustrative although the robot control system 200 has been described as above, and it will be apparent to those skilled in the art that at least a part of the functions or components required for the robot control system 200 may be implemented or included in the robot 300 to be described below or an external system (not shown), as necessary. Further, in some cases, all of the functions and components of the robot control system 200 may be implemented or included in the robot 300.

Next, the robot 300 according to one embodiment of the invention is a device that may communicate with the robot control system 200 via the communication network 100, and may autonomously perform predetermined functions or assigned tasks (e.g., serving food, retrieving containers, etc.) without any operation of a user. The robot 300 may include at least one of a module (e.g., a grab, a robotic arm module, etc.) for loading and unloading an object (e.g., a food tray), an imaging module (e.g., a visible light camera, an infrared camera, etc.) for acquiring images of surroundings, a microphone module for acquiring sounds of surroundings, a display and speaker module for providing images and sounds, and a drive module (e.g., a motor) for moving the robot 300. For example, the robot 300 may have characteristics or functions similar to those of at least one of a guide robot, a transport robot, a cleaning robot, a medical robot, an entertainment robot, a pet robot, and an unmanned flying robot.

Meanwhile, according to one embodiment of the invention, the robot 300 may include an application for performing robot control according to the invention. The application may be downloaded from the robot control system 200 or an external application distribution server (not shown).

Configuration of the Robot Control System

Hereinafter, the internal configuration of the robot control system 200 crucial for implementing the invention and the functions of the respective components thereof will be discussed.

Figure 2:
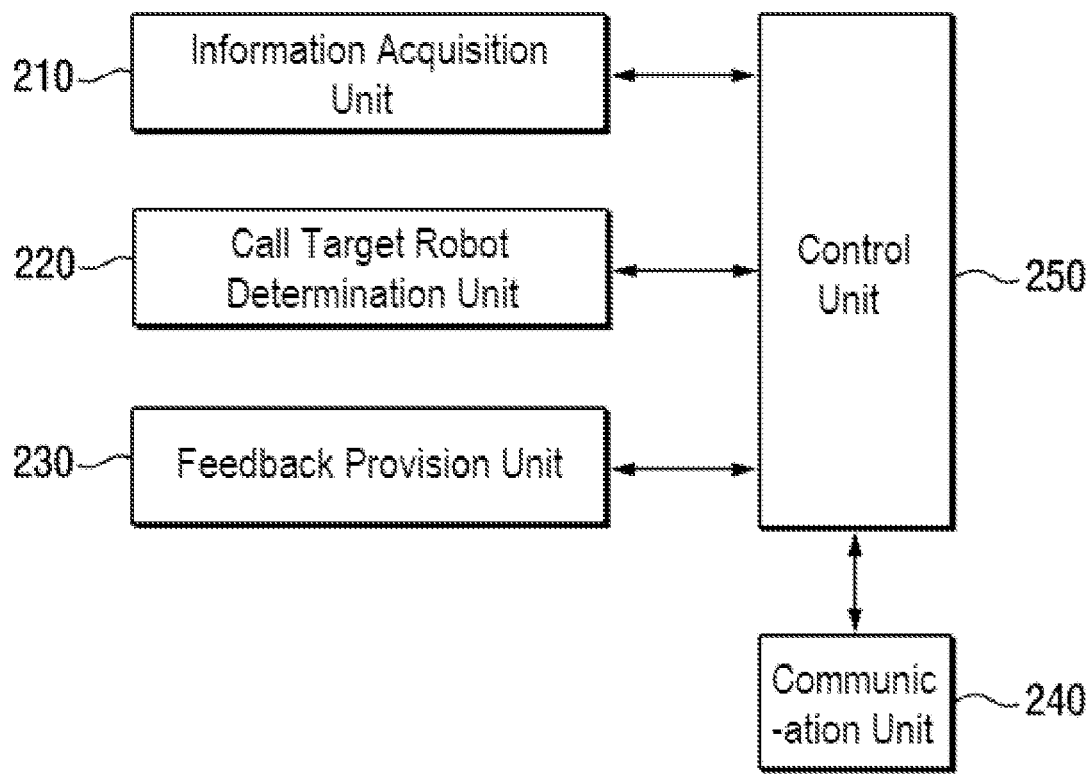
FIG. 2 illustratively shows the internal configuration of a robot control system according to one embodiment of the invention.

FIG. 2 illustratively shows the internal configuration of the robot control system 200 according to one embodiment of the invention.

As shown in FIG. 2, the robot control system 200 according to one embodiment of the invention may comprise an information acquisition unit 210, a call target robot determination unit 220, a feedback provision unit 230, a communication unit 240, and a control unit 250. According to one embodiment of the invention, at least some of the information acquisition unit 210, the call target robot determination unit 220, the feedback provision unit 230, the communication unit 240, and the control unit 250 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

First, the information acquisition unit 210 according to one embodiment of the invention may function to acquire information on a sound associated with a robot call in a serving place. For example, the sound associated with the robot call (hereinafter, "call sound") according to one embodiment of the invention may include a sound related to a name, phrase, term, or command for referring to or calling a specific robot. Further, the call sound may be specified with reference to a lookup table for a plurality of phrases, terms, or commands for referring to or calling a specific robot, or a result of learning call sounds acquired from at least one serving place or patterns specified on the basis of the call sounds. In addition, the information on the call sound according to the invention may include information on physical characteristics of the call sound (e.g. a waveform, intensity (or amplitude), and pitch of the call sound) and linguistic characteristics of the call sound (e.g., a meaning, interpretation, and context of the call sound). Meanwhile, according to one embodiment of the invention, names, phrases, terms, or commands used to call a plurality of robots 300 (or robots 300 included in a specific group consisting of a predetermined number of robots 300) in the serving place may be identical to each other. For example, when the serving place is a restaurant, names for a customer or employee in the restaurant to call a first robot 300 and a second robot 300 may be identical to each other.

For example, when the serving place is a restaurant and a call sound including a name for calling the robot 300 is uttered by a customer or employee in the restaurant (e.g., a call sound "Servi!" is uttered if the name for calling the robot 300 in the serving place is set to Servi), the information acquisition unit 210 may acquire information on a waveform, intensity, pitch, meaning, and the like of the call sound including the name.

Further, the information acquisition unit 210 may acquire situation information of the serving place using an image or sound acquisition module (e.g., CCTV) installed in the serving place or the robot 300, and may trigger acquisition of the call sound with reference to the situation information. The situation information according to one embodiment of the invention may be information on context, action intention, and the like specified with respect to a time point when the sound is uttered. In addition, the situation information may be specified with reference to a lookup table for a plurality of pieces of situation information corresponding to a plurality of images or sounds acquired from at least one serving place.

For example, when the serving place is a restaurant and a sound is uttered by a customer or employee in the restaurant, the information acquisition unit 210 may determine whether the sound is a call sound, using situation information specified with respect to a time point when the sound is uttered, and may acquire information on the sound if the sound is determined to be the call sound.

Next, the call target robot determination unit 220 according to one embodiment of the invention may function to determine a call target robot 300 associated with the call sound, among a plurality of robots 300 in the serving place, on the basis of the information acquired by the information acquisition unit 210.

For example, the call target robot determination unit 220 may determine the call target robot 300 associated with the call sound with reference to at least one of a direction and intensity of the call sound specified by each of the plurality of robots 300 in the serving place. Here, the direction of the sound may be specified by analyzing information on the call sound acquired from each of a plurality of microphones that may be included in each of the robots 300, or analyzing information on the call sound acquired from at least one microphone included in each of the plurality of robots 300 (e.g., integrating and analyzing information on the call sound acquired from a microphone of each of the plurality of robots 300).

More specifically, the call target robot determination unit 220 may determine call candidate robots 300 with reference to the intensity of the call sound specified by each of the plurality of robots 300 (e.g., since a robot 300 is closer to a location where the call sound is uttered, compared to other robots 300 in the serving place, as the intensity of the call sound specified by the robot 300 is greater, a predetermined number of robots 300 may be determined as the call candidate robots 300 according to the descending order of the intensity of the call sound), and may determine the call target robot 300 with reference to the direction of the call sound specified by each of the call candidate robots 300 (e.g., when the direction of the call sound specified by a robot 300 among the call candidate robots 300 matches with the actual (or estimated) location where the call sound is uttered in the serving place at or above a predetermined level, the robot 300 may be determined as the call target robot 300). (Here, the actual (or estimated) location where the call sound is uttered may be specified on the basis of the directions of the call sound specified by the plurality of robots 300 or a predetermined number or more of the robots 300.) Further, the call target robot determination unit 220 may determine call candidate robots 300 with reference to the direction of the call sound specified by each of the plurality of robots 300, and may determine the call target robot 300 with reference to the intensity of the call sound specified by each of the call candidate robots 300.

In addition, the call target robot determination unit 220 may determine the call target robot 300 associated with the call sound with reference to spatial information of the serving place. The spatial information of the serving place according to one embodiment of the invention may include information on topography, geography, structure, material, obstacles, and the like of the serving place.

For example, there may be a pattern of reflection or refraction of a sound uttered in the serving place due to a wall, ceiling, table, and the like of the serving place, and the call target robot determination unit 220 may determine the call target robot 300 associated with the call sound with further reference to information on the pattern.

As another example, the call target robot determination unit 220 may learn at least one of a direction and intensity of the call sound specified by each of the robots 300 according to a location of the robot 300 or a location where the call sound is uttered in the serving place, and may determine the call target robot 300 associated with the call sound with further reference to a result of the learning.

Further, the call target robot determination unit 220 may determine the call target robot 300 associated with the call sound with reference to information on tasks assigned to the plurality of robots 300. The information on the tasks according to one embodiment of the invention may include information on tasks assigned to the robots 300 to perform in the serving place. For example, when the serving place is a restaurant, the information on the tasks may be information on serving food, retrieving food dishes, indoor cleaning, and the like.

For example, the call target robot determination unit 220 may determine the call target robot 300 from among the robots 300 to which no tasks are assigned among the plurality of robots 300 in the serving place. More specifically, the call target robot determination unit 220 may determine the call target robot 300 associated with the call sound by analyzing at least one of a direction and intensity of the call sound specified by each of the plurality of robots 300 in the serving place to which no tasks are assigned. Further, the call target robot determination unit 220 may determine call candidate robots 300 by analyzing at least one of a direction and intensity of the call sound specified by each of the plurality of robots 300 in the serving place, and may preferentially determine a robot 300 to which no task is assigned, among the call candidate robots 300, as the call target robot 300.

As another example, the call target robot determination unit 220 may determine the call target robot 300 from among the robots 300 other than the robots 300 to which tasks having priority not less than a predetermined level (i.e., tasks having great importance) are assigned among the plurality of robots 300 in the serving place. More specifically, the call target robot determination unit 220 may determine the call target robot 300 associated with the call sound by analyzing at least one of a direction and intensity of the call sound specified by each of the robots 300 other than the robots 300 to which tasks having priority not less a predetermined level are assigned among the plurality of robots 300 in the serving place. Further, the call target robot determination unit 220 may determine call candidate robots 300 by analyzing at least one of a direction and intensity of the call sound specified by each of the plurality of robots 300 in the serving place, and may preferentially determine the call target robot 300 from among the robots 300 other than the robots 300 to which tasks having priority not less than a predetermined level are assigned among the call candidate robots 300.

Meanwhile, when a first robot 300 performing a first task is determined as the call target robot 300, the call target robot determination unit 220 may assign the first task being performed by the first robot 300 to another robot 300 in the serving place.

For example, when the first robot 300 performing the first task is determined as the call target robot 300, the call target robot determination unit 220 may assign the first task to a robot 300 located closest to the first robot 300 or a robot 300 performing a second task having priority lower than the first task (or performing no task).

Further, the call target robot determination unit 220 may determine the call target robot 300 associated with the call sound with reference to gaze information of an utterer associated with the call sound. The gaze information according to one embodiment of the invention may include information on a direction that the utterer of the call sound is gazing at with respect to a time point when the call sound is uttered in the serving place.

For example, the call target robot determination unit 220 may determine the call target robot 300 associated with the call sound by analyzing at least one of a direction and intensity of the call sound specified by each of the robots 300 located in the direction that the utterer of the call sound is gazing at with respect to the time point when the call sound is uttered in the serving place (e.g., the robots 300 located within a predetermined range with respect to the direction) among the plurality of robots 300 in the serving place. Further, the call target robot determination unit 220 may determine call candidate robots 300 by analyzing at least one of a direction and intensity of the call sound specified by each of the plurality of robots 300 in the serving place, and may determine a robot 300 located in the direction that the utterer of the call sound is gazing at with respect to the time point when the call sound is uttered in the serving place (e.g., a robot 300 located within a predetermined range with respect to the direction), among the call candidate robots 300, as the call target robot 300.

Next, the feedback provision unit 230 may function to provide feedback associated with the call sound by the call target robot 300.

For example, the feedback provision unit 230 may cause the call target robot 300 to move to a location associated with the call sound (or a location of a user associated with the call sound) in the serving place. Here, the location associated with the call sound may be determined on the basis of a meaning or context of the call sound. For example, when a name of the robot 300 is Servi, the location associated with a call sound "Servi, go to the kitchen." may be a kitchen.

As another example, the feedback provision unit 230 may cause the call target robot 300 to provide visual feedback such as blinking an LED lamp, or aural feedback such as outputting a sound "Yes, I will go right now."

Next, according to one embodiment of the invention, the communication unit 240 may function to enable data transmission/reception from/to the information acquisition unit 210, the call target robot determination unit 220, and the feedback provision unit 230.

Lastly, according to one embodiment of the invention, the control unit 250 may function to control data flow among the information acquisition unit 210, the call target robot determination unit 220, the feedback provision unit 230, and the communication unit 240. That is, the control unit 250 according to one embodiment of the invention may control data flow into/out of the robot control system 200 or data flow among the respective components of the robot control system 200, such that the information acquisition unit 210, the call target robot determination unit 220, the feedback provision unit 230, and the communication unit 240 may carry out their particular functions, respectively.

Figure 3:
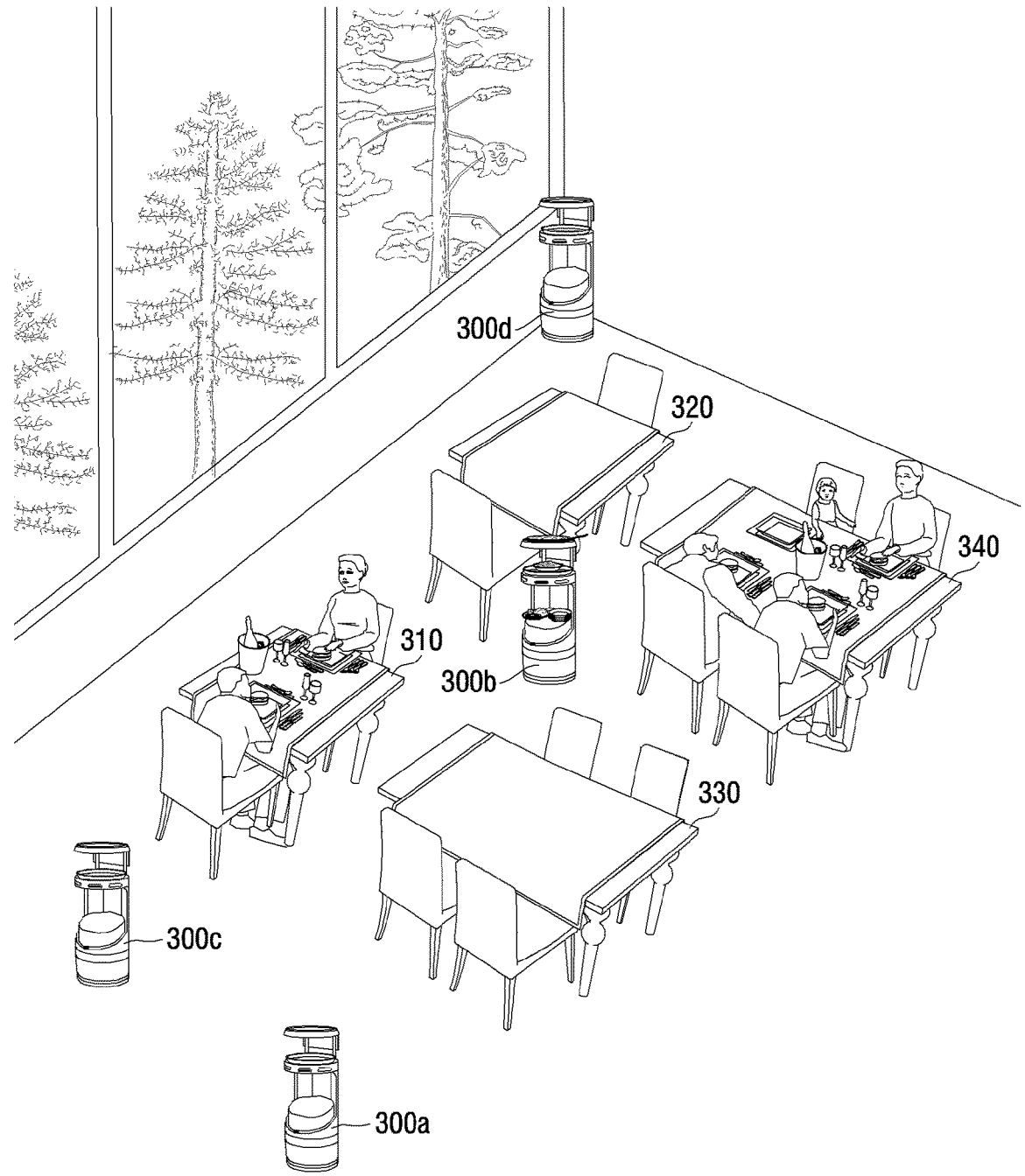
FIG. 3 illustratively shows a situation in which a robot is controlled in a serving place according to one embodiment of the invention.
Figure 4:
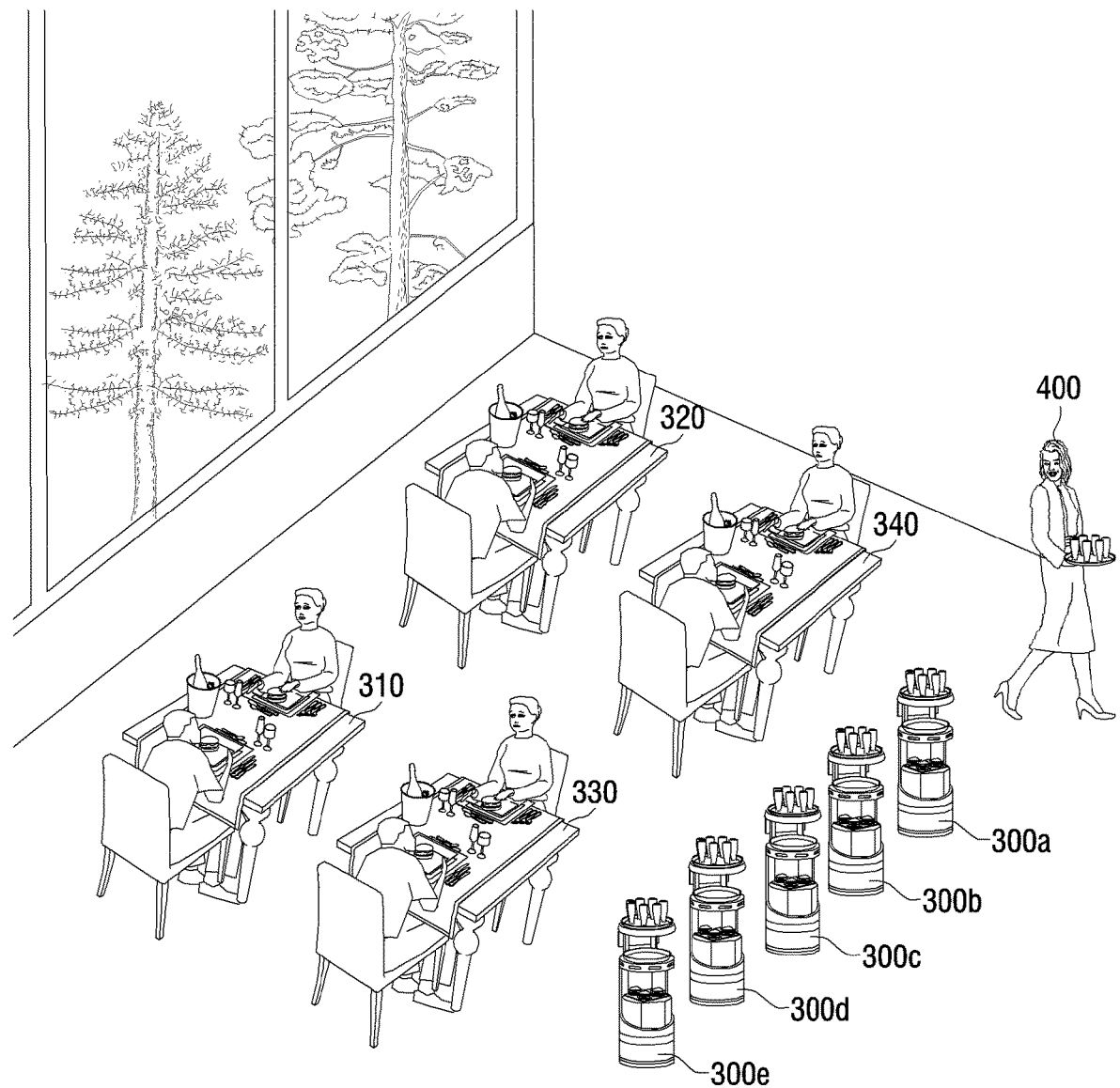
FIG. 4 illustratively shows a situation in which a robot is controlled in a serving place according to one embodiment of the invention.

FIGS. 3 and 4 illustratively show situations in which the robot 300 is controlled in a serving place according to one embodiment of the invention.

First Embodiment

Referring to FIG. 3, it may be assumed that the serving place according to the invention is a restaurant and services associated with the serving place are provided to customers visiting the serving place by a plurality of robots 300a, 300b, 300c, and 300d. For example, when the serving place according to one embodiment of the invention is a restaurant, the services associated with the serving place may include services such as order taking, serving, payment taking, and reception.

First, according to one embodiment of the invention, information on a sound associated with a robot call uttered by a customer located at a table 310, 320, 330, or 340 in the restaurant may be acquired. More specifically, information on a call sound "Servi!" uttered by a male customer at the fourth table 340 in the restaurant may be acquired.

Next, according to one embodiment of the invention, a call target robot 300 associated with the call sound may be determined from among the plurality of robots 300a, 300b, 300c, and 300d in the restaurant, with reference to at least one of a direction and intensity of the call sound specified by each of the plurality of robots 300a, 300b, 300c, and 300d. For example, the direction of the call sound may be specified as an angle on the basis of a relative coordinate system specified with respect to each of the robots 300 or an absolute coordinate system specified with respect to the serving place. For example, the intensity of the call sound may be specified by assigning a score of 1 to 10 on the basis of the relative difference in the intensity of the sound acquired by each of the plurality of robots 300, and more specifically, the intensity of the call sound specified by the robot 300 that has acquired the loudest sound may be 10, and the intensity of the call sound specified by the robot 300 that has acquired the quietest sound may be 1.

For example, when the information on the call sound "Servi!" uttered by the male customer at the fourth table 340 in the restaurant is acquired, and the right side, the upper side, the left side, and the lower side with respect to a current location of each of the robots 300a, 300b, 300c, and 300d (e.g., with respect to a point where each of the robots is currently located) are set to 0 degrees, 90 degrees, 180 degrees, and 270 degrees, respectively, the intensity and direction of the call sound specified by the first robot 300a may be 1 and 60 degrees; the intensity and direction of the call sound specified by the second robot 300b may be 10 and 10 degrees; the intensity and direction of the call sound specified by the third robot 300c may be 2 and 40 degrees; and the intensity and direction of the call sound specified by the fourth robot 300d may be 5 and 300 degrees. That is, the direction of the call sound specified by each of the first robot 300a, the second robot 300b, the third robot 300c, and the fourth robot 300d leads to the same location (or point) in the serving place, and the intensity of the call sound specified by the second robot 300b is the greatest among those specified by the first robot 300a, the second robot 300b, the third robot 300c, and the fourth robot 300d, so that the second robot 300b may be determined as the call target robot 300.

Meanwhile, the call target robot 300 associated with the call sound may be determined considering that the direction or intensity of the call sound specified by the plurality of robots 300a, 300b, 300c, and 300d may be changed as the call sound is reflected or refracted due to walls, obstacles, and the like in the restaurant.

For example, when the information on the call sound "Servi!" uttered by the male customer at the fourth table 340 in the restaurant is acquired, and the right side, the upper side, the left side, and the lower side with respect to a current location of each of the robots 300a, 300b, 300c, and 300d (e.g., with respect to a point where each of the robots is currently located) are set to 0 degrees, 90 degrees, 180 degrees, and 270 degrees, respectively, the intensity and direction of the call sound specified by the first robot 300a may be 1 and 60 degrees; the intensity and direction of the call sound specified by the second robot 300b may be 9 and 10 degrees; the intensity and direction of the call sound specified by the third robot 300c may be 2 and 40 degrees; and the intensity and direction of the call sound specified by the fourth robot 300d may be 10 and 160 degrees. That is, the direction of the call sound specified by each of the first robot 300a, the second robot 300b, and the third robot 300c leads to the same location (or point) in the serving place, whereas the direction of the call sound specified by the fourth robot 300d may lead to a different location (e.g., a wall) compared to the other robots 300a, 300b, and 300c due to reflection of the call sound. In this case, the intensity of the call sound specified by the second robot 300b is the greatest among those specified by the robots other than the fourth robot 300d for which the direction of the call sound is different (i.e., the first robot 300a, the second robot 300b, and the third robot 300c), so that the second robot 300b may be determined as the call target robot 300.

Meanwhile, the call target robot 300 associated with the call sound may be determined from among the plurality of robots 300a, 300b, 300c, and 300d in the serving place by analyzing at least one of the direction and intensity of the call sound specified by each of the plurality of robots 300a, 300b, 300c, and 300d with further reference to a result of learning information on a sound pattern (e.g., reflection pattern, refraction pattern, or diffraction pattern) specified on the basis of spatial information of the restaurant.

Next, according to one embodiment of the invention, feedback associated with the call sound may be provided by the call target robot 300.

For example, when the second robot 300b is determined as the call target robot 300 from among the plurality of robots 300a, 300b, 300c, and 300d, the second robot 300b may provide a sound "Yes, I will go right now." while moving to the table 340 associated with the call sound (or the location of the customer who has uttered the call sound) in the restaurant.

Second Embodiment

Hereinafter, referring to FIG. 3 again, another situation will be described in which the robot 300 is controlled in a serving place according to one embodiment of the invention. As in the first embodiment, it may be assumed that the serving place according to the invention is a restaurant and services associated with the serving place are provided to customers visiting the serving place by a plurality of robots 300a, 300b, 300c, and 300d.

First, according to one embodiment of the invention, information on a sound associated with a call uttered by a customer located at a table 310, 320, 330, or 340 in the restaurant may be acquired. More specifically, information on a call sound "Servi!" uttered by a male customer at the fourth table 340 in the restaurant may be acquired.

Next, according to one embodiment of the invention, when the robots in the serving place to which no tasks are assigned are the second robot 300b and the fourth robot 300d, the second robot 300b associated with the call sound may be determined as a call target robot 300 by analyzing at least one of a direction and intensity of the call sound specified by each of the robots 300b and 300d to which no tasks are assigned among the plurality of robots 300a, 300b, 300c, and 300d in the serving place. Further, according to one embodiment of the invention, call candidate robots 300b and 300c may be determined by analyzing at least one of a direction and intensity of the call sound specified by each of the plurality of robots 300a, 300b, 300c, and 300d in the serving place, and the robot 300b to which no task is assigned among the call candidate robots 300b and 300c may be determined as the call target robot 300.

Next, the call target robot 300 (e.g., the second robot 300b) may provide a sound "Yes, I will go right now." (or blink an LED lamp) while moving to the table 340 associated with the call sound in the restaurant.

Third Embodiment

Hereinafter, referring to FIG. 4, another situation will be described in which the robot 300 is controlled in a serving place according to one embodiment of the invention. As in the first and second embodiments, it may be assumed that the serving place according to the invention is a restaurant and services associated with the serving place are provided to customers visiting the serving place by a plurality of robots 300a, 300b, 300c, 300d, and 300e. For example, when the serving place according to one embodiment of the invention is a restaurant, the services associated with the serving place may include services such as order taking, serving, payment taking, and reception.

First, according to one embodiment of the invention, information on a call sound "Servi!" uttered by a customer located at a fourth table 340 in the restaurant and information on a call sound "Servi!" uttered by an employee 400 in the restaurant may be acquired simultaneously or sequentially within a predetermined time.

Next, according to one embodiment of the invention, a call target robot 300 may be determined from among the robots 300 other than the robots 300 to which tasks having priority not less than a predetermined level are assigned among the plurality of robots 300a, 300b, 300c, 300d, and 300e in the serving place.

For example, when the first robot 300a, which is performing a first task of moving to the employee 400 upon a call by the employee 400, is assigned a task having priority higher than the first task (i.e., a second task of moving to a table 310, 320, 330, or 340 in the restaurant upon a call by a customer located at the table 310, 320, 330, or 340), the first task may be assigned to the second robot 300b located closest to the first robot 300a, among the second robot 300b, the third robot 300c, the fourth robot 300d, and the fifth robot 300e to which no tasks or tasks having priority lower than the first task are assigned.

Next, the first robot 300a may provide a sound "Yes, customer. I will go right now." while moving to the table 310, 320, 330, or 340 associated with the call sound in the restaurant. Further, the second robot 300b may provide a sound "Yes, employee. I will go right now." while moving to the location of the employee 400 who has uttered the call sound in the restaurant.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 5:
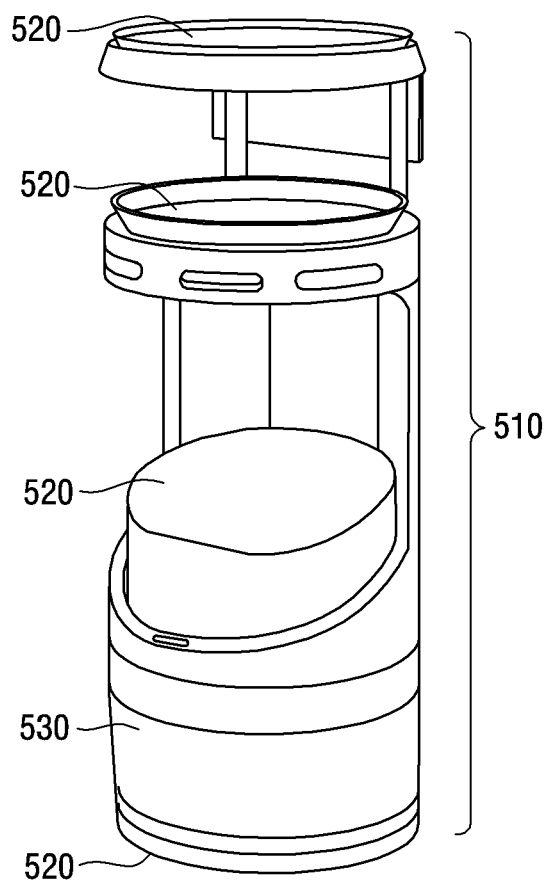
FIG. 5 illustratively shows the structure of a robot according to one embodiment of the invention.

Referring to FIG. 5, the robot 300 may comprise a main body 510, a drive unit 520, and a processor 530.

For example, the main body 510 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Figure 6:
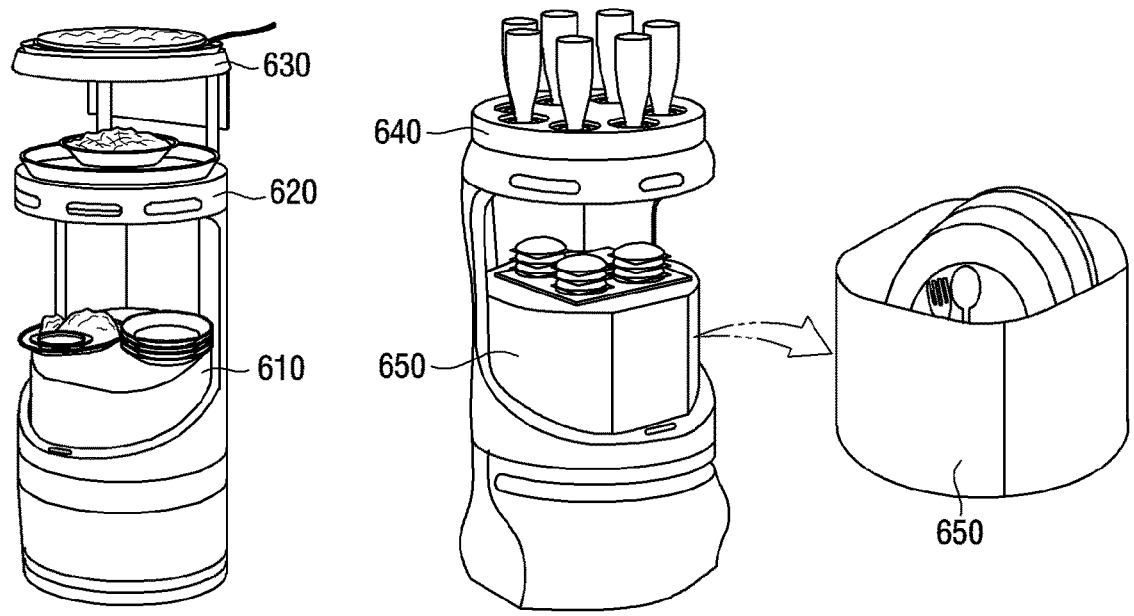
FIG. 6 illustratively shows the structure of a robot according to one embodiment of the invention.

Referring to FIG. 6, when the robot 300 is a serving robot, it may include a first space 610 and a second space 620 for providing the transported object and collecting the retrieved object. Further, the robot 300 may further include a third space 630 that is an expansion space provided via a removable pillar, and more loading spaces may be provided by adding more expansion spaces as needed. Further, the robot 300 may further include a tray 640 dedicated for the transported or retrieved object. For example, the tray 640 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 610 of the robot 300 may include a fourth space 650 that may be taken out through a lateral side of the robot 300. The fourth space 650 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 5, the main body 510 may further include an imaging module (e.g., a visible light camera, an infrared camera, etc.) (not shown) and a scanner module (e.g., a LIDAR sensor) for acquiring images of surroundings (e.g., customers, tables, employees, other robots 300, etc.) and information on obstacles.

Next, the drive unit 520 according to one embodiment of the invention may comprise a module for moving the main body 510 to other locations or a module for loading and unloading the transported and retrieved objects.

For example, the drive unit 520 may include a module related to electrically, mechanically, or hydraulically driven wheels, propellers, or the like as the module for moving the main body 510 to other locations, and may include a robotic arm module for mounting and conveying the transported and retrieved objects as the module for loading and unloading the transported and retrieved objects.

Next, the processor 530 according to one embodiment of the invention may be electrically connected to the drive unit 520 to perform a function of controlling the drive unit 520 (and may include a communication module for communicating with an external system). For example, the processor 530 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 530 may perform the functions of at least one of the information acquisition unit 210, the call target robot determination unit 220, and the feedback provision unit 230 of the robot control system 200 according to the invention (e.g., the corresponding functions may be modularized and included in the processor 530), and may function to control the drive unit 520 through communication with an external system (not shown) that performs the functions of at least one of the information acquisition unit 210, the call target robot determination unit 220, and the feedback provision unit 230.

Specifically, the processor 530 may function to: acquire information on a sound associated with a robot call in a serving place of a robot 300; determine a call target robot 300 associated with the sound, among a plurality of robots 300 in the serving place, on the basis of the acquired information; and provide feedback associated with the sound by the call target robot 300.

Although the embodiments in which the serving place according to the invention is a restaurant have been mainly described above, it is noted that the serving place is not necessarily limited to a restaurant, and may be changed to a cafe, pub, bar, or the like without limitation as long as the objects of the invention may be achieved.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a robot, the method comprising the steps of:
acquiring information on a sound associated with a robot call in a serving place;
determining a call target robot associated with the sound, among a plurality of robots in the serving place, on the basis of the acquired information; and
causing the call target robot to autonomously provide feedback associated with the sound,
wherein in the determining step, first call candidate robots are determined with reference to an intensity of the sound specified by each of the plurality of robots, and the call target robot is determined with reference to a direction of the sound specified by each of the first call candidate robots, or second call candidate robots are determined with reference to a direction of the sound specified by each of the plurality of robots, and the call target robot is determined with reference to an intensity of the sound specified by each of the second call candidate robots.

2. The method of claim 1, wherein in the determining step, the call target robot is determined with reference to spatial information of the serving place.

3. The method of claim 1, wherein in the determining step, the call target robot is determined with reference to information on tasks assigned to the plurality of robots.

4. The method of claim 1, wherein in the causing step, the call target robot is caused to autonomously move to a location associated with the sound in the serving place.

5. A non-transitory computer-readable recording medium having stored thereon a computer program for executing the method of claim 1.

6. A system for controlling a robot, the system comprising:
one or more processors configured to:
acquire information on a sound associated with a robot call in a serving place;
determine a call target robot associated with the sound, among a plurality of robots in the serving place, on the basis of the acquired information; and
cause the call target robot to autonomously provide feedback associated with the sound,
wherein the one or more processors are configured to determine first call candidate robots with reference to an intensity of the sound specified by each of the plurality of robots, and determine the call target robot with reference to a direction of the sound specified by each of the first call candidate robots, or to determine second call candidate robots with reference to a direction of the sound specified by each of the plurality of robots, and determine the call target robot with reference to an intensity of the sound specified by each of the second call candidate robots.

7. The system of claim 6, wherein the one or more processors are configured to determine the call target robot with reference to spatial information of the serving place.

8. The system of claim 6, wherein the one or more processors are configured to determine the call target robot with reference to information on tasks assigned to the plurality of robots.

9. The system of claim 6, wherein the one or more processors are configured to cause the call target robot to autonomously move to a location associated with the sound in the serving place.

10. The method of claim 1, wherein causing the call target robot to autonomously provide the feedback includes causing the call target robot to provide visual feedback or aural feedback.

11. The system of claim 6, wherein causing the call target robot to autonomously provide the feedback includes causing the call target robot to provide visual feedback or aural feedback.

* * * * *